United States Patent [19]
Koyama et al.

[11] Patent Number: 6,061,416
[45] Date of Patent: May 9, 2000

[54] FUEL ASSEMBLY

[75] Inventors: Junichi Koyama, Hitachi; Motoo Aoyama, Mito; Koji Nishida, Hitachiohta; Junichi Yamashita, Hitachi, all of Japan

[73] Assignee: Hitachi, Ltd., Tokyo, Japan

[21] Appl. No.: 09/022,678

[22] Filed: Feb. 12, 1998

[30] Foreign Application Priority Data

Feb. 13, 1997 [JP] Japan .................................. 9-028714

[51] Int. Cl.[7] .............................. G21C 3/32; G21C 3/00; G21C 3/30
[52] U.S. Cl. .......................... 376/435; 376/419; 376/428; 376/462
[58] Field of Search ..................... 376/419, 428, 376/435, 462

[56] References Cited

U.S. PATENT DOCUMENTS

| | | | |
|---|---|---|---|
| 4,683,113 | 7/1987 | Mochida et al. | 376/419 |
| 4,876,063 | 10/1989 | Johansson | 376/444 |
| 4,968,479 | 11/1990 | Ogiya et al. | 376/428 |
| 5,008,070 | 4/1991 | Aoyama et al. | 376/419 |
| 5,017,332 | 5/1991 | Dix et al. | 376/370 |
| 5,112,570 | 5/1992 | Dix et al. | 376/370 |
| 5,249,211 | 9/1993 | Nagano et al. | 376/435 |
| 5,367,547 | 11/1994 | Hida et al. | 376/435 |
| 5,377,247 | 12/1994 | Yoshioka et al. | 376/428 |
| 5,388,132 | 2/1995 | Aoyama et al. | 376/435 |
| 5,432,829 | 7/1995 | Aoyama et al. | 376/434 |
| 5,544,211 | 8/1996 | Haikawa et al. | 376/435 |

FOREIGN PATENT DOCUMENTS

| | | |
|---|---|---|
| 63-127190 | 5/1988 | Japan . |
| 2-002977 | 1/1990 | Japan . |
| 2-103491 | 4/1990 | Japan . |
| 5-341071 | 12/1993 | Japan . |
| 7-301688 | 11/1995 | Japan . |
| 7-311291 | 11/1995 | Japan . |
| 8-292281 | 11/1996 | Japan . |

*Primary Examiner*—Charles T. Jordan
*Assistant Examiner*—Jack Keith
*Attorney, Agent, or Firm*—Beall Law Offices

[57] ABSTRACT

Each of short-length fuel rods 3 is arranged at a position other than in 3×3 corner regions 6 to 9 in such a manner as not to be simultaneously adjacent to a water rod 5 and others of the short-sized fuel rods. Gd fuel rods 4 are arranged at positions excluding the outer periphery, and the number of those of the Gd fuel rods 4 adjacent to the short-length fuel rods 3 is one-half or less the total number of the Gd fuel rods. At a transverse cross-section of a region upward from upper ends of the short-sized fuel rods 3, the amount of burnable poison contained in a polygonal region 10 whose vertexes are located at centers of those of the first fuel rods 3 arranged at the outermost layer is smaller than the amount of burnable poison outside the region 10. With this configuration, a critical power can be improved in consideration of both a distribution of the flow of coolant and a distribution of a thermal power in the fuel assembly.

8 Claims, 8 Drawing Sheets

FUEL ASSEMBLY

BACKGROUND OF THE INVENTION

The present invention relates to a fuel assembly to be loaded in a boiling water reactor, and particularly to a fuel assembly aimed at attainment of high burnup.

In a boiling water reactor, recently, high burnup for increasing the amount of energy generated per unit weight of fuel is expected from the viewpoint of both effective utilization of uranium resource and reduction in generation amount of spent fuel. To attain high burnup, it is necessary to enhance an average enrichment of a fissile contained in a fuel assembly. It is also known that, to promote effective reaction of a fissile for keeping stability of a boiling water reactor, it is required to increase a rate of the amount of a moderator with increased enrichment of a fissionable material.

A technique for effectively increase a rate of the amount of a moderator is disclosed FIG. 24 of in Japanese Patent Laid-open No. Hei 5-232273. This technique describes a fuel assembly 1 shown in FIG. 2, which has large-sized water rods 5, and short-length fuel rods 3 shorter than other fuel rods 2. In the fuel assembly shown in FIG. 2, the fuel rods are arranged in a square grid patten of 9-columns/9-rows, and two pieces of the large-sized water rods 5 are arranged in a region containing seven grid points at a central portion of the fuel assembly. The number of long-length fuel rods 2 is 66 pieces and the number of the short-length fuel rods is 8 pieces. The use of the short-sized fuel rods extends a flow passage of coolant on an upper portion of the fuel assembly, to increase the amount of a neutron moderator on an upper portion of a core, thereby promoting a fission reaction. The use of the short-sized fuel rods has another effect of reducing a pressure loss from the viewpoint of the flow of coolant, thus improving stability of the core.

A critical power of a fuel assembly is important as the scale of a thermal margin of the fuel assembly to be loaded in a boiling water reactor. The critical power is defined as a maximum thermal power of the fuel assembly within a range in which there occurs no boiling transition of fuel rods under a condition of the amount of coolant flowing in the fuel assembly. The larger the critical power of the fuel assembly, the larger the thermal margin. In many cases, since boiling transition occurs at a fuel rod exhibiting the maximum thermal power to restrict the critical power of the fuel assembly. Accordingly, the critical power becomes larger as a difference in power between the fuel rods becomes smaller and a power distribution in the fuel assembly becomes flatter. On the other hand, even when the power of the fuel rods is uniform, if there exists unevenness in the flow rate of coolant around each fuel rod, boiling transition tends to occur at a position where the flow rate of coolant is small, thus making small the critical power.

With respect to a thermal margin of a fuel assembly including short-sized fuel rods, Japanese Patent Laid-open No. Hei 5-232273 describes a technique in which short-sized fuel rods are provided at positions other than in the vicinity of corners of a fuel assembly, to flatten a power distribution in the fuel assembly. Besides, Japanese Patent Laid-open No. Hei 5-341071 describes the fact that upper portions of fuel rods adjacent to short-sized fuel rods are effectively cooled because a flow passage of coolant is wide on the upper side of upper ends of the short-sized fuel rods.

With respect to the fuel assembly having short-sized fuel rods described in Japanese Patent Laid-open No. Hei 5-232273, a configuration in which fuel rods containing burnable poison are arranged for reducing a power peaking at a cool state is disclosed in Japanese Patent Laid-open No. Hei 8-292281.

Of the above-described prior art fuel assemblies, the fuel assembly disclosed in Japanese Patent Laid-open No. Hei 5-232273 describes that the arrangement of the short-sized fuel rods at positions other than in the vicinity of the corners improves stability while flattening the power distribution in the fuel assembly; however, the document fails to sufficiently examine the effect on the flow of coolant.

In the fuel assembly disclosed in Japanese Patent Laid-open No. Hei 5-232273, the arrangement of the short-sized fuel rods at positions other than in the corner regions acts to increase the critical power from the viewpoint of flattening of the power distribution. On the other hand, according to the fuel assembly disclosed in Japanese Patent Laid-open No. Hei 5-341071, the arrangement of the short-sized fuel rods at positions other than in the corner regions acts to decrease the critical power from the viewpoint of flow of a coolant. As a result, the net effect of improving the critical power is unclear.

Japanese Patent Laid-open No. Hei 5-341071 describes the effect due to the local flow of coolant at positions of the short-sized fuel rods. The document, however, does not examine an effect on the flow distribution of the entire fuel assembly including positions apart from the short-sized fuel rods and an effect of the short-sized fuel rods on the power distribution in the fuel assembly.

Japanese Patent Laid-open No. Hei 5-232273 does not examine distributions of a fissile or burnable poison. On the other hand, Japanese Patent Laid-open No. Hei 8-292281 describes a distribution of burnable poison. The document, however, is intended to suppress a power peaking at a cool temperature, and it does not examine improvement in thermal margin upon operation of the feel assembly.

SUMMARY OF THE INVENTION

A first object of the present invention is to provide a fuel assembly capable of improving a thermal margin, particularly, a critical power upon operation in consideration of both a distribution of the flow of coolant and a distribution of a thermal power in the fuel assembly having short-sized fuel rods. The distribution of thermal power is affected by distributions of a fissile and burnable poison, and arrangement of short-sized fuel rods.

A second object of the present invention is to provide a fuel assembly capable of improving a critical power while reducing a void coefficient to improve stability of a high burnup core.

To achieve the first object, according to a first invention, there is provided a fuel assembly including: a plurality of fuel rods including a plurality of first fuel rods shorter in length than others of the fuel rods and a plurality of second fuel rods containing burnable poison, the plurality of fuel rods being arranged in a square grid pattern of 9-columns/9-rows or more; and at least one neutron moderator rod; wherein each of the first fuel rods is arranged at a position other than in 3-columns/3-rows regions (3×3 corner regions) at four corner portions in such a manner as not to be simultaneously adjacent to said at least one neutron moderator rod and others of the first fuel rods in the four directions of front and rear and right and left; the second fuel rods are arranged at positions excluding the outermost periphery; the number of those, of the second fuel rods, adjacent to the first fuel rods in said four directions of front and rear and right and left is one-half or less the total number of the second fuel rods; and at a transverse cross-section of a region upward from upper ends of the first fuel rods, the amount of burnable poison contained in a polygonal region whose vertexes are located at centers of those, of the first fuel rods, arranged at the outermost layer is smaller than the amount of burnable poison outside the polygonal region.

To achieve the first object, according to a second invention, there is provided a fuel assembly including: a plurality of fuel rods including a plurality of first fuel rods shorter in length than others of the fuel rods and a plurality of second fuel rods containing burnable poison, the plurality of fuel rods being arranged in a square grid pattern of 9-columns/9-rows or more; and at least one neutron moderator rod; wherein each of the first fuel rods is arranged at a position other than in 3×3 corner regions at four corner portions in such a manner as not to be simultaneously adjacent to said at least one neutron moderator rod and others of the first fuel rods in the four directions of front and rear and right and left; the second fuel rods are arranged at positions excluding the outermost periphery; and most of fuel rods being adjacent to the first fuel rods in said four directions of front and rear and right and left and containing no burnable poison have a maximum average enrichment of a fissile in a region upward from upper ends of the first fuel rods.

To achieve the second object, according to a third invention, there is provided a fuel assembly including: a plurality of fuel rods including a plurality of first fuel rods shorter in length than others of the fuel rods and a plurality of second fuel rods containing burnable poison, the plurality of fuel rods being arranged in a square grid pattern of 9-columns/9-rows or more; and at least one neutron moderator rod; wherein the first fuel rods are arranged at positions other than in 3×3 corner regions at four corner portions, and the first fuel rods are arranged at each side of the outermost periphery; the second fuel rods are arranged at positions excluding the outermost periphery; the number of those, of the second fuel rods, adjacent to the first fuel rods in the four directions of front and rear and right and left is one-half or less the total number of the second fuel rods; and at a transverse cross-section of a region upward from upper ends of the first fuel rods, the amount of burnable poison contained in a polygonal region whose vertexes are located at centers of those, of the first fuel rods, arranged at the outermost layer is smaller than the amount of burnable poison outside the polygonal region.

To achieve the second object, according to a fourth invention, there is provided a fuel assembly including: a plurality of fuel rods including a plurality of first fuel rods shorter in length than others of the fuel rods and a plurality of second fuel rods containing burnable poison, the plurality of fuel rods being arranged in a square grid pattern of 9-columns/9-rows or more; and a neutron moderator; wherein the first fuel rods are arranged at positions other than in 3×3 corner regions at four corner portions, and the first fuel rods are arranged at each side of the outermost periphery; the second fuel rods are arranged at positions excluding the outermost periphery; and most of fuel rods being adjacent to the first fuel rods in the four directions of front and rear and right and left and containing no burnable poison have a maximum average enrichment of a fissile in a region upward from upper ends of the first fuel rods.

DETAILED DESCRIPTION OF THE PREFERRED EMBODIMENTS (Embodiment 1)

Figure 1:
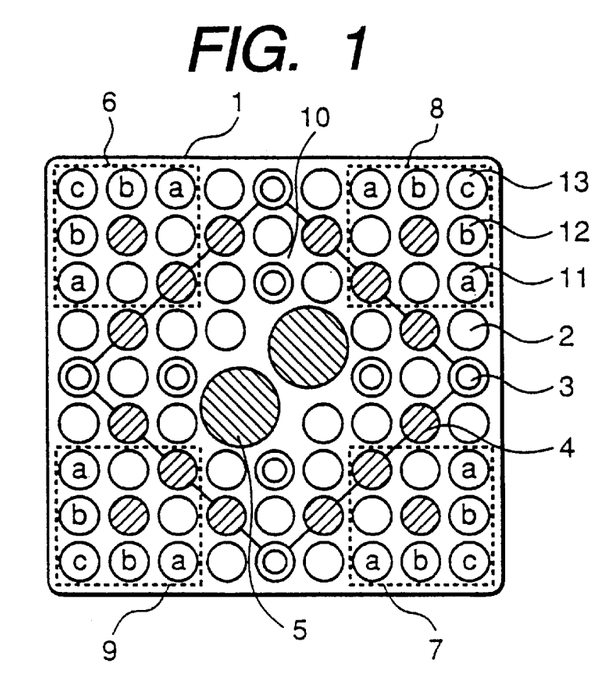
FIG. 1 is a transverse sectional view showing a first embodiment of a fuel assembly of the present invention.
Figure 15:
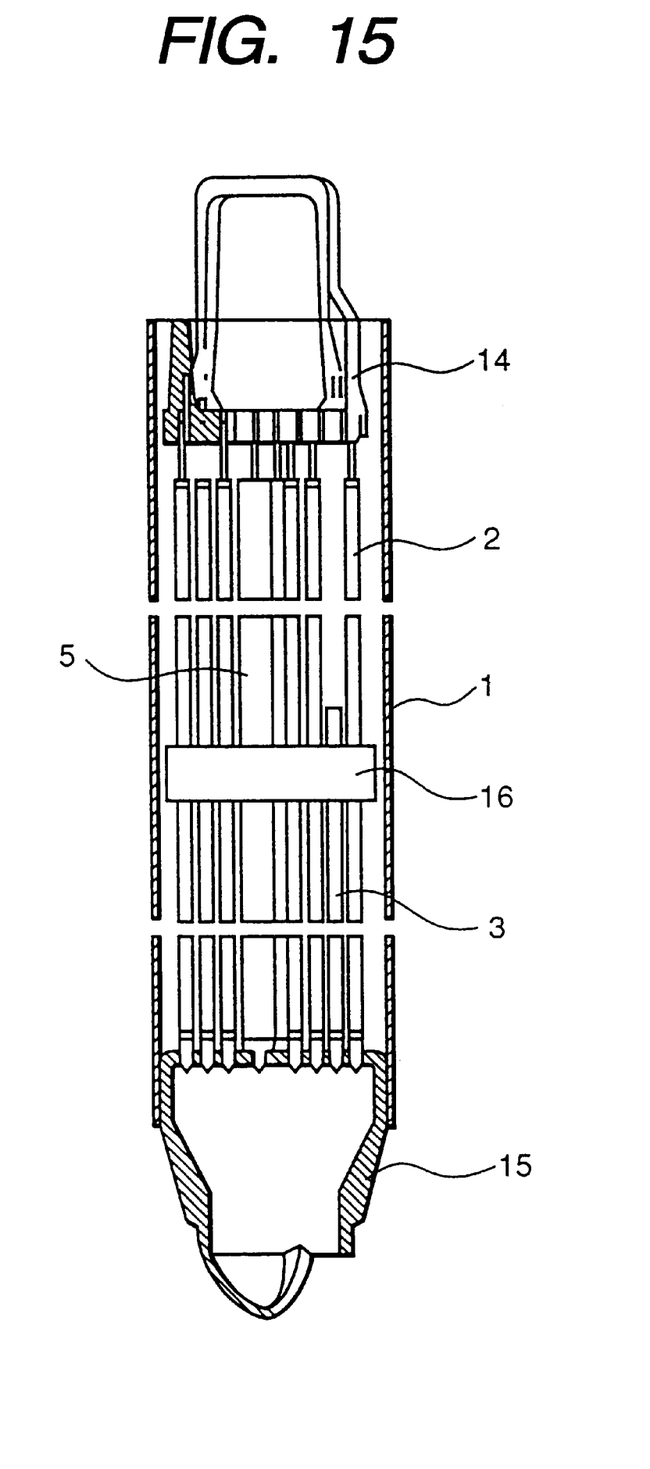
FIG. 15 is a schematic vertical section showing the first embodiment of the fuel assembly of the present invention.

Hereinafter, a first embodiment in which the present invention is applied to a fuel assembly for a boiling water reactor will be described with reference to FIGS. 1 and 15. FIG. 1 is a transverse sectional view of the first embodiment, and FIG. 15 is a schematic vertical sectional view of the first embodiment. This fuel assembly includes a square cylinder type channel box 1 and a fuel bundle contained in the channel box 1. The fuel bundle includes a plurality of fuel rods in each of which fuel pellets containing a fissile are enclosed, an upper tie plate 14 and a lower tie plate 15 for supporting upper and lower portions of the fuel rods respectively, and a plurality of spacers 16 for holding gaps between the fuel rods.

The fuel rods include long-sized fuel rods each having a relatively long fuel effective length, and short-length fuel rods 3 each having a fuel effective length shorter than that of the long-sized fuel rod. The long-sized fuel rods include fuel rods 2, 11, 12 and 13 each containing only uranium dioxide ($UO_2$), and burnable poison containing fuel rods 4 each containing both $UO_2$ and gadolinia as burnable poison (hereinafter, referred to as "Gd fuel rods"). Each of the short-length fuel rods 3 contains only $UO_2$. Reference numeral 5 indicates a large-sized water rod, formed into a circular shape in cross-section, functioning as a neutron moderator.

With respect to an average uranium(U-235) enrichment (hereinafter, referred to simply as an "average enrichment") of the long-sized fuel rods in a region upward from upper ends of the short-length fuel rods 3 (hereinafter, referred to as an "upper region"), it becomes lower in the order of the fuel rod 2, fuel rod 11 (character a in FIG. 1), fuel rod 12 (character b in FIG. 1), and fuel rod 13 (character c in FIG.

1). That is, the fuel rod 2 has the maximum enrichment, and the fuel rod 13 has the minimum enrichment. The fuel rods adjacent to the short-length fuel rods 3 in the four directions of front and rear and right and left are all the fuel rods 2 each having the maximum enrichment. In addition, a state being adjacent to a fuel rod in the four directions of front and rear and right and left is referred to simply as "a state being adjacent to a fuel rod" hereinafter. The fuel rod 2 adjacent to the short-sized fuel rod 3 at the outermost periphery of the fuel assembly is adjacent to one Gd fuel rod 4.

The upper end of the short-sized fuel rod 3 is at a level being about $17/24$ of a fuel effective length (length of a fuel packing portion) of the fuel rod 2. The upper end of a fuel packing portion of the short-sized fuel rod 3 is at a level being about $15/24$ of the fuel effective length of the fuel rod 2. The Gd fuel rod 4 has a fuel effective length being substantially equal to that of the fuel rod 2.

In this embodiment, the fuel rods are arranged in a square grid pattern of nine-columns/nine-rows, and two pieces of the water rods 5 are disposed in a region containing seven grid points at a central portion of the fuel assembly. Further, four pieces of the short-length fuel rods 3 are disposed at each center of four outermost peripheral sides, and four pieces of the remaining short-length fuel rods 3 are disposed adjacently to the water rods 5. The fuel rods of 66 pieces are present at the transverse cross-section of the upper region of the fuel assembly. Any short-sized fuel rod 3 is not disposed in three-columns/three-rows corner regions (hereinafter, referred to as "3×3 corner regions") 6 to 9 at four corners of the fuel assembly. Further, the short-sized fuel rod 3 adjacent to the water rod 5 is not adjacent to another short-sized fuel rod.

The Gd fuel rod 4 contains burnable poison in the upper region. The Gd fuel rods 4 of 16 pieces are arranged at positions excluding the outermost periphery of the fuel assembly. A region 10 is formed of a polygonal (square) shape whose vertexes are located at centers of four pieces of the short-sized fuel rods arranged at the outermost layer of the fuel assembly. At the transverse cross-section of the upper region of the fuel assembly, the amount of burnable poison contained in the region 10 is equivalent to that contained in 6 pieces of the Gd fuel rods, which is smaller than the amount of burnable poison outside the region 10 (equivalent to that contained in ten pieces of the Gd fuel rods).

In a core of a boiling water reactor, moderation of neutrons is promoted in a non-boiling water region which exists around a fuel assembly. This allows nuclear fission reaction to be actively generated from the fuel rods at the outermost periphery of the fuel assembly. As a result, the thermal power of the fuel rods at the outermost of the fuel assembly becomes highest, tending to restrict the critical power of the fuel assembly. In particular, the 3×3 corner region is a region in which the power tends to become highest in the fuel assembly.

Figure 2:
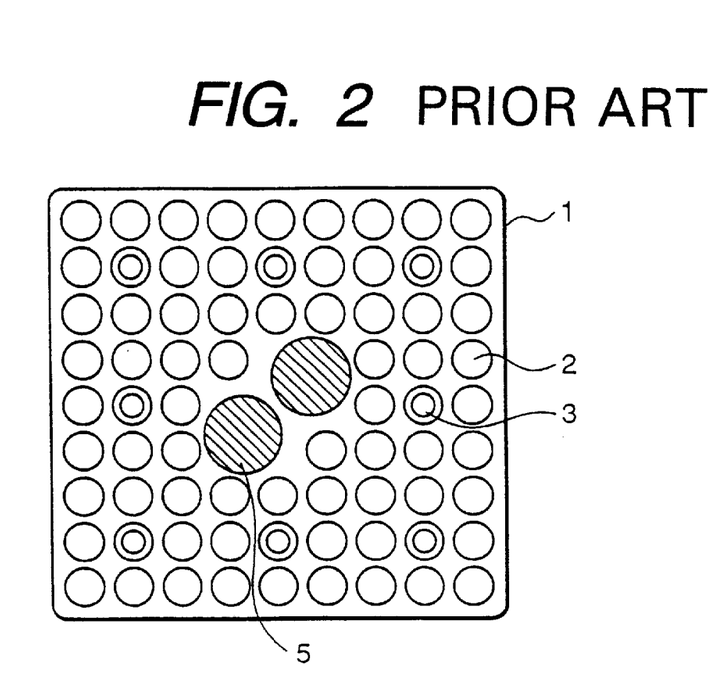
FIG. 2 is a transverse sectional view showing a prior art fuel assembly.

In the prior art arrangement shown in FIG. 2, short-length fuel rods 3 are present near corners of a fuel assembly. Accordingly, since a moderator (coolant) is concentrated at portions on the upper side of the short-sized fuel rods 3, moderation of neutrons are further promoted, as a result of which the power of the fuel rods in the corner regions becomes higher.

In this embodiment, since any short-sized fuel rod is not present near the corners and thereby a moderator is not concentrated at the corner regions, the power of the fuel rods at the corner regions is suppressed, to obtain a relatively flat power distribution. For example, for the same distribution of uranium enrichment (hereinafter, referred to simply as "enrichment") in the fuel assembly, the power of the fuel rods at the second row from the corners in FIG. 1 is made to be about 5% smaller than that of the fuel assembly shown in FIG. 2, with a result that, for the same flow of the coolant, the critical power is improved.

On the other hand, as a result of evaluating the flow rate distribution of the coolant at the transverse cross-section of the upper region in FIG. 1, it becomes apparent that the flow rate of the coolant flowing in the corner regions is made to be about 3% smaller than that of the fuel assembly shown in FIG. 2. This is because, in the case shown in FIG. 1, a large amount of the coolant flows in upper spaces of the short-length fuel rods 3 disposed at positions excluding the corner regions. Further, since the upper portions of the fuel rods 2 adjacent to the short-length fuel rods 3 face to a wide flow passage of the coolant, cooling is effectively performed. From the viewpoint of the flow of the coolant, for the same power of the fuel rods at the corner regions, there is a tendency that the critical power of the arrangement shown in FIG. 2 becomes higher.

As described above, it becomes apparent that in the case of changing arrangement of the short-sized fuel rods from the arrangement shown in FIG. 2 to that shown in FIG. 1, there occurs both effects of increasing and decreasing the critical power. The present inventors have quantitatively evaluated the critical power and found the fact that the critical power of a fuel assembly can be improved by arranging short-sized fuel rods not to be contained in 3×3 corner regions and also adjusting distributions of burnable poison and a fissionable material.

Further, as a result of fully examining arrangement of short-sized fuel rods, it becomes apparent that short-sized fuel rods should be arranged in relation to neutron moderators (water rods). A neutron moderator slightly generates heat, and in particular, since a flow passage of coolant becomes wider at a peripheral portion of a large-sized neutron moderator disturbing a regular arrangement of fuel rods, the coolant is liable to flow in the peripheral portion of the neutron moderator. Consequently, the presence of a neutron moderator causes a deviation in flow rate of coolant in a fuel assembly.

Figure 10:
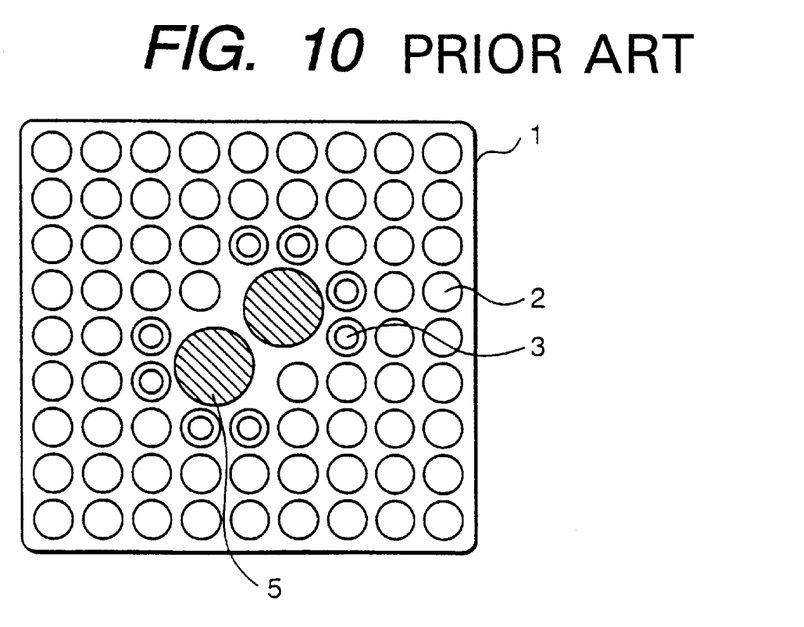
FIG. 10 is a transverse sectional view showing a prior art fuel assembly.

FIG. 10 shows a transverse sectional view of a prior art fuel assembly described in Japanese Patent Laid-open No. Hei 8-292281. In this example, short-length fuel rods 3 are arranged in a state being concentrated near water rods 5. As a result of evaluating flow of coolant in this arrangement, it becomes apparent that the flow rate of the coolant at corner regions is made to be about 3% lower than that in the arrangement shown in FIG. 1. The reason for this is that the flow of the coolant is increased near the water rods. Accordingly, in this fuel assembly, the flow of the coolant is concentrated at a central portion being not strict in thermal condition, and the flow rate of the coolant is decreased at the corner regions being strict in thermal condition. As a result, in this arrangement, the critical power is reduced.

In this embodiment, the enrichment of the short-length fuel rods 3 near the water rods 5 as shown in FIG. 10 is avoided. To be more specific, in the arrangement shown in FIG. 1, each short-sized fuel rod 3 is disposed not to be simultaneously adjacent to the water rod 5 and another short-sized fuel rod 3. With this configuration, it is possible to achieve the first object of the present invention, that is, to obtain an effect of improving the critical power of a fuel assembly.

Further, to achieve the second object of the present invention, that is, to improve a void factor, it is known that arrangement of short-sized fuel rods at the outermost periphery of a fuel assembly or near a water rod is effective. On the other hand, it has been found that from the viewpoint of a distribution of the flow rate of coolant, it is desired to arrange short-sized fuel rods on the outer peripheral side of a fuel assembly for increasing the flow rate of the coolant on the outer peripheral side. For this reason, in this embodiment, four short-sized fuel rods 3 are disposed at each side of the outer most periphery of the fuel assembly. Such a configuration is larger in the effect of moderating neutrons than that shown in FIG. 2. As a result, an absolute value of a void coefficient is made small, tending to ensure stability of a high burnup core.

The objects of the present invention can be achieved by adopting arrangement of short-sized fuel rods in consideration of a distribution of the flow rate of coolant in a fuel assembly as described above, and also adopting distributions of burnable poison and a fissile which will be described below.

Figure 3:
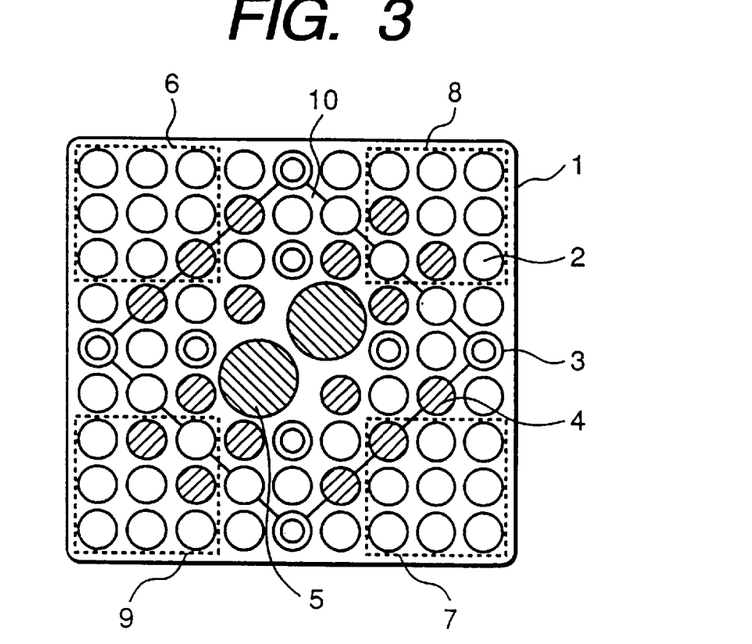
FIG. 3 is a transverse sectional view showing a fuel assembly of a first comparative example.

A first comparative example for comparatively examining the effect of the Gd fuel rods is shown in FIG. 3. In this comparative example, the arrangement of the short-length fuel rods 3 is the same as that shown in FIG. 1, but the arrangement of the Gd fuel rods 4 is different from that shown in FIG. 1. In the fuel assembly shown in FIG. 1, the amount of gadolinia present in the 3×3 corner regions 6 to 9 in which the short-length fuel rods 3 are not present is larger than that in the 3×3 corner regions 6 to 9 of the fuel assembly shown in FIG. 3. Since low energy neutrons causing a fission reaction are absorbed by gadolinia, the power of the fuel rods in this region shown in FIG. 1 is made about 3% smaller than that in the region shown in FIG. 3. That is, the critical power of the fuel assembly in FIG. 1 is improved about 3% as compared with the fuel assembly shown in FIG. 3.

Based on the above knowledge, the short-sized fuel rods are arranged to be offset inwardly of the fuel assembly, and the Gd fuel rods (burnable poison) are arranged to be offset outwardly of the fuel assembly. Now, there is assumed a polygonal region whose vertexes are located at the centers of the short-sized fuel rods arranged at the outermost layer in the fuel assembly. A relatively large amount of the coolant flows inside this region, and the flow rate of the coolant is relatively lacking outside this region. Accordingly, by arranging a relatively large amount of burnable poison outside this region, it becomes possible to reduce the power of the fuel rods and hence to cope with the lacking state of the flow rate of the coolant.

In this embodiment, since the short-sized fuel rods are not arranged in the 3×3 corner regions, the Gd fuel rods can be concentratedly arranged in the 3×3 corner regions. The flattening effect of the power distribution due to arrangement of the Gd fuel rods in the 3×3 corner regions overcomes the demerit in terms of the above-described flow rate distribution, so that the critical power of the fuel assembly in FIG. 1 is improved more than that of the fuel assembly in FIG. 2. Further, since the possibility of causing boiling transition is small at a position adjacent to the short-sized fuel rod, the fuel rod containing no burnable poison is desirably disposed at such a position, and the Gd fuel rod is disposed at a position being strict in thermal condition. This makes it possible to further improve the thermal margin.

In this embodiment, the possibility of causing boiling transition is high at the fuel rods at the outermost periphery in each of the 3×3 corner regions, particularly, at the fuel rod 12 positioned at the second column from the corner. Based on such a knowledge, the Gd fuel rod 4 is disposed at a position inwardly adjacent to the fuel rod 12. Since the thermal power of the Gd fuel rod 4 is low, a thermal load to a peripheral flow passage becomes small as compared with the case where the fuel rod containing no burnable poison is adjacent to the fuel rod 12, to thereby obtain a high cooling effect. Further, arrangement of the Gd fuel rods in the region in which the short-sized fuel rods are not present is not only effective to lower the entire power of the fuel rods in this region but also effective to prevent occurrence of boiling transition of the adjacent fuel rods.

Incidentally, in the case where the Gd fuel rods are arranged at the outermost periphery of the fuel assembly, the reactivity worth of a control rod at the beginning of burning tends to be reduced. In this embodiment, the reactivity worth of a control rod is prevented from being reduced by arranging the Gd fuel rods 4 at positions other than at the outermost periphery of the fuel assembly.

Figure 4:
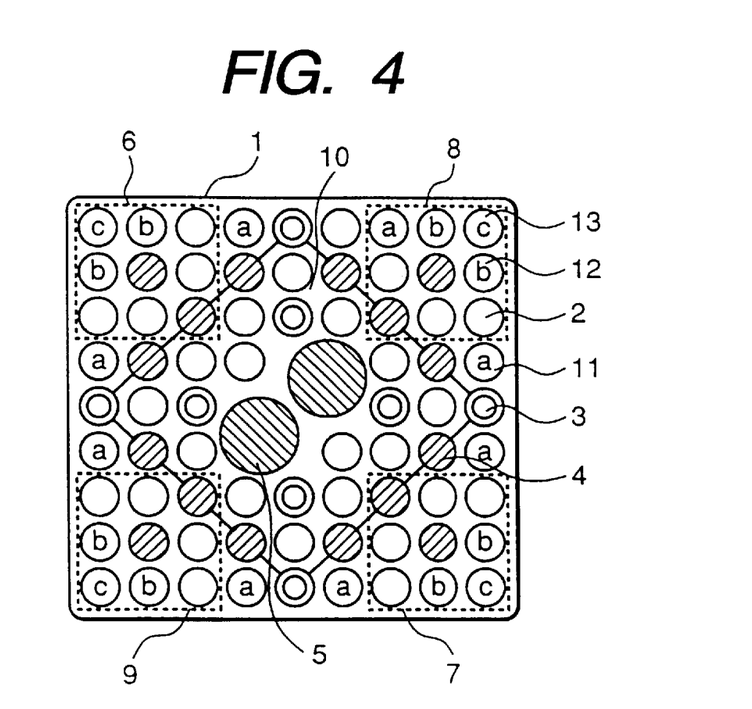
FIG. 4 is a transverse sectional view showing a fuel assembly of a second comparative example.

FIG. 4 shows a second comparative example for comparatively examining an effect of the adjacent relationship between the short-sized fuel rod and the fuel rod having the maximum enrichment. The fuel assembly shown in FIG. 4 is configured that in the fuel assembly shown in FIG. 1, each of the fuel rods 2 adjacent to the short-length fuel rods 3 at the outermost periphery is replaced with each of the fuel rods 11 at the third columns from the corners at the outermost periphery. In this comparative example, each of the fuel rods 2 (having the maximum enrichment) at the third columns from the corners at the outermost periphery generates the critical power, to thereby restrict the critical power. On the contrary, in the fuel assembly shown in FIG. 1, the power of each of the fuel rods at the third columns from the corners at the outermost periphery is reduced about 4% as compared with that in the fuel assembly shown in FIG. 4.

In the fuel assembly shown in FIG. 1, the power of each of the fuel rods at the fourth columns from the corners at the outermost periphery is increased about 3% as compared with that in the fuel assembly shown in FIG. 4; however, since a large amount of the coolant is present on the upper side of the short-sized fuel rod 3 adjacent thereto, the fuel rod 2 does not function as the fuel rod restricting the critical power. Also, in the fuel assembly shown in FIG. 1, since each of the fuel rods 2 at the fourth columns from the corners is adjacent to the Gd fuel rod 4 being relatively small in heat generation amount, the fuel rod 2 is less susceptible to boiling transition.

In general, the power of each of the fuel rods in the 3×3 corner regions tends to be increased, so that it is difficult to maximize the enrichment of the fuel rod. In this embodiment, since the short-length fuel rods 3 are not arranged in the 3×3 corner regions, most of the fuel rods adjacent to the short-length fuel rods 3 are not in the 3×3 corner regions. Accordingly, in this embodiment, it is possible to maximize the enrichment of each of the fuel rods adjacent to the short-sized fuel rods 3.

To be more specific, in a condition in which an average enrichment of a fuel assembly is specified, by maximizing an average enrichment in the upper region of fuel rods adjacent to short-sized fuel rods and located at positions being not severe in heat transfer just as this embodiment, an average enrichment of fuel rods located at other position being strict in heat transfer can be lowered. The flattening effect of the power distribution due to the above arrangement in terms of average enrichment overcomes the demerit of the above-described flow rate distribution, so that the critical power of the fuel assembly shown in FIG. 1 can be improved more than that in the fuel assembly shown in FIG. 2.

Also, in this embodiment, the above-described effect can be obtained by making lower the average enrichment in the upper region of the fuel rods 2 arranged at a layer positioned inwardly from the outermost periphery than that of the fuel rods 2 arranged at the outermost periphery.

Further, in the case where the number of the fuel rods at the transverse cross-section of the upper region of the fuel assembly is decreased, a heat generation amount per one fuel rod in the upper region is increased, tending to lower the critical power. Accordingly, to obtain a critical power higher than that of the fuel assembly shown in FIG. 2, the number of the fuel rods at the transverse cross-section of the upper region is desired to be set at 66 pieces or more like this embodiment.

(Embodiment 2)

Figure 5:
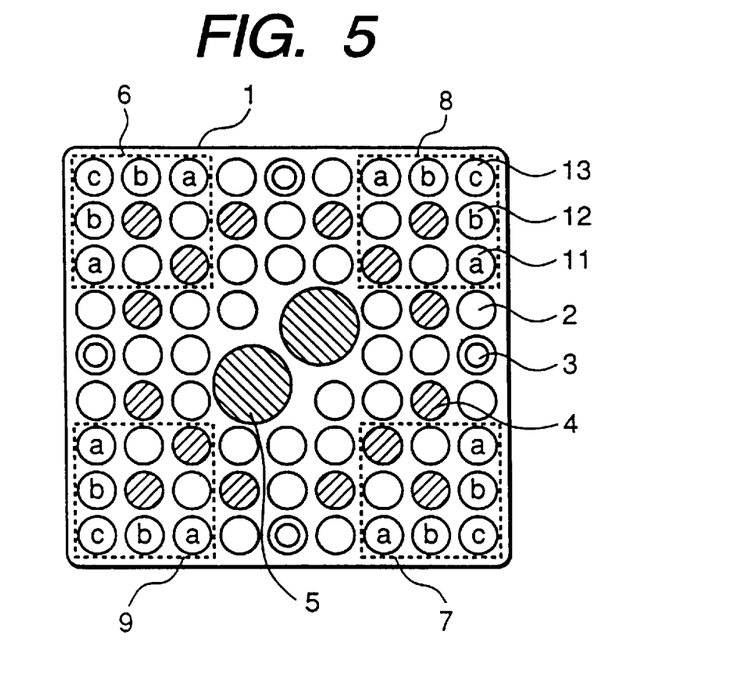
FIG. 5 is a transverse sectional view showing a second embodiment of the fuel assembly of the present invention.

Next, a second embodiment of the present invention will be described with reference to FIG. 5. This embodiment is configured that in the first embodiment shown in FIG. 1, four pieces of the short-length fuel rods 3 adjacent to the water rods 5 are replaced with the fuel rods 2. The upper end of the short-sized fuel rod 3 is at a level being about one-half of the fuel effective length of the fuel rod 2. The fuel effective length of the Gd fuel rod 4 is at a level being about $71/72$ of the fuel effective length of the fuel rod 2. At the transverse cross-section of the fuel assembly in the upper region (upward from upper ends of the short-sized fuel rods 3) are present 70 pieces of the fuel rods. The other configuration is the same as that of the first embodiment.

In this embodiment, a polygonal region whose vertexes are located at centers of the short-length fuel rods 3 arranged at the outermost layer is the same as the region 10 in the first embodiment. The distribution of burnable poison at the transverse cross-section of the upper region is also the same as that shown in FIG. 1.

In this embodiment, since the number of the short-length fuel rods 3 is smaller than that in the fuel assembly shown in FIG. 1, a distribution of the flow rate of coolant at the upper portion of the fuel assembly becomes more uniform and the overall heat transfer area of the fuel rods is increased about 2% as compared with that in the fuel assembly shown in FIG. 1. As a result, the critical power in this embodiment is increased about 1% as compared with that of the fuel assembly shown in FIG. 1.

By setting the fuel effective length of the Gd fuel rod 4 to be slightly shorter (about $1/72$) than that of the fuel rod, the volume of plenum in the Gd fuel rod 4 is increased. Since the plenum functions as a space for storing gas discharged from fuel pellets, the structure in this embodiment is more suitable for high burnup. Such a slight difference in fuel effective length little influences the effect of the present invention.

In addition, to obtain a high neutron absorbing effect by the Gd fuel rods 4, the Gd fuel rods 4 are desired to be disposed in such a manner as not to be adjacent to each other in the four directions of front and rear and right and left. From this viewpoint, in addition to arrangement of the Gd fuel rods 4 shown in FIG. 5, the Gd fuel rods 4 can be arranged at six position adjacent to the water rods 5 and obliquely adjacent to the Gd fuel rods 4 in FIG. 5.

Consequently, a desirable neutron absorbing effect can be obtained by arranging the Gd fuel rods 4 at positions selected from 22 positions including the above six positions.

(Embodiment 3)

Figure 6:
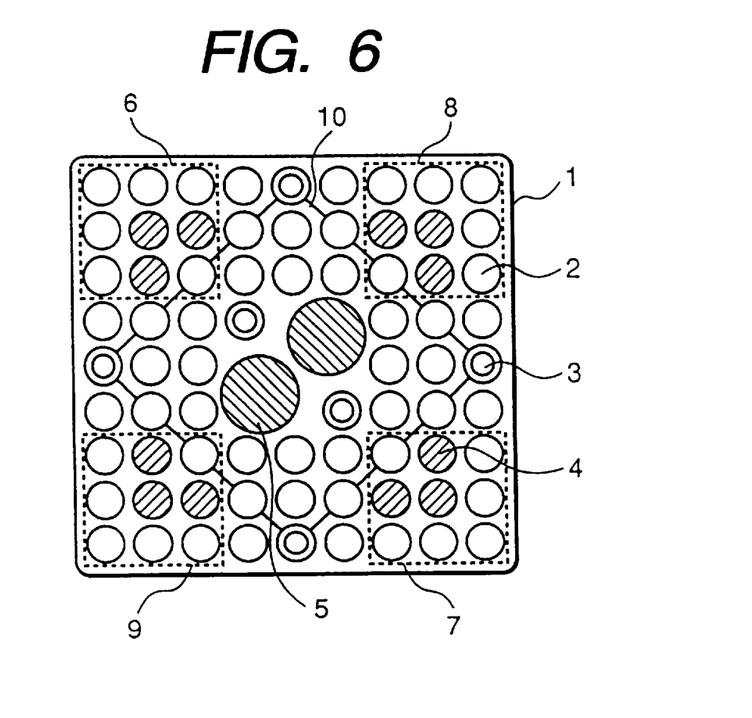
FIG. 6 is a transverse sectional view showing a third embodiment of the fuel assembly of the present invention.

A third embodiment of the present invention will be described below with reference to FIG. 6. Even in this embodiment, the fuel rods are arranged in a square grid pattern of 9-columns/9-rows, and two pieces of the water rods 5 are arranged in a region containing seven grid points at a central portion of the fuel assembly. Four pieces of the short-length fuel rods 3 are disposed at the centers of the outermost periphery and two pieces of the remaining short-length fuel rods 3 are disposed at positions adjacent to both the water rods 5. At the transverse cross-section of the upper region of the fuel assembly are present 68 pieces of the fuel rods. Even in this embodiment, the short-length fuel rods 3 are not disposed in the four 3×3 corner regions 6 to 9. Further, one short-sized fuel rod 3 adjacent to both the water rods 5 is not adjacent to the other short-sized fuel rod 3.

In this embodiment, 12 pieces of the Gd fuel rods 4 are all arranged at positions in the 3×3 corner regions 6 to 9 excluding the outermost peripheries thereof, and are not adjacent to the short-sized fuel rods 3. Further, a polygonal region whose vertexes are located at the centers of the short-length fuel rods 3 arranged at the outermost layer is the same as the region 10 shown in FIG. 1. The Gd fuel rods 4 are all arranged outside the, region 10.

In this embodiment, by arranging all of the Gd fuel rods 4 in the 3×3 corner regions 6 to 9 not containing the short-sized fuel rods 3, it is possible to effectively reduce the power of each corner region being low in the flow rate of coolant and hence to improve the critical power. Further, in the fuel assembly shown in FIG. 6, the number of the Gd fuel rods 4 being low in heat generation amount is smaller than that in the fuel assembly shown in FIG. 1. Accordingly, in this embodiment, the power distribution in the fuel assembly can be further flattened as compared with that in the first embodiment, with a result that the critical power is made higher.

(Embodiment 4)

Figure 7:
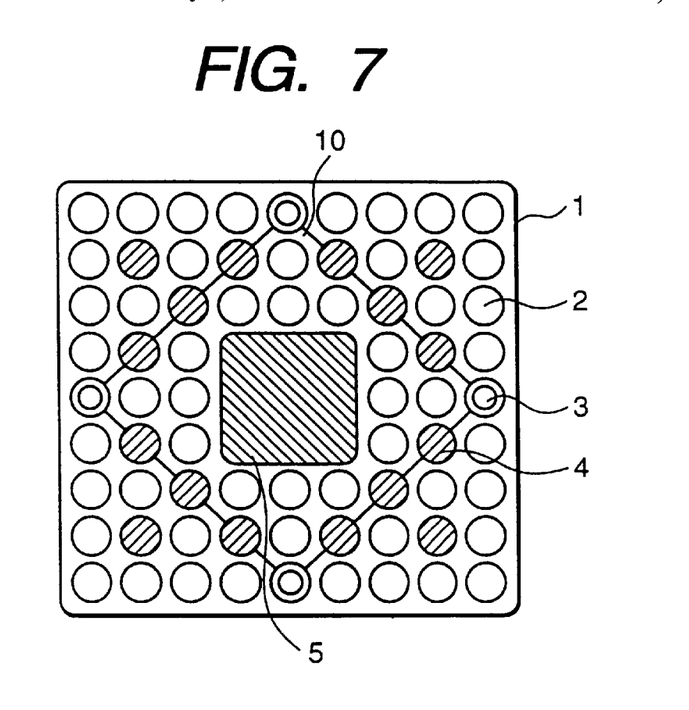
FIG. 7 is a transverse sectional view showing a fourth embodiment of the fuel assembly of the present invention.

A fourth embodiment of the present invention will be described below with reference to FIG. 7. In this embodiment, the fuel rods are arranged in a square grid pattern of 9-columns/9-rows. A larger-sized water rod 5 formed into a square shape in transverse cross-section is used as a neutron moderating rod. The water rod 5 is disposed at a region containing nine grid points at a central portion of the fuel assembly. Four pieces of the short-length fuel rods 3 are disposed at the centers of the four outermost peripheral sides. That is, the short-length fuel rods 3 are not adjacent to the water rod 5 and are disposed at positions other than in the four 3×3 corner regions.

In this embodiment, 68 pieces of the fuel rods are present at the transverse cross-section of the upper region. The Gd fuel rods 4 of 16 pieces are disposed at positions excluding the outermost periphery, and are not adjacent to the short-sized fuel rods 3. A polygonal region whose vertexes are located at the centers of the short-length fuel rods 3 arranged at the outermost layer is the same as the region 10 shown in FIG. 1. The amount of burnable poison present in the region 10 is equivalent to that contained in six pieces of the Gd fuel rods, which is smaller than the amount of burnable poison outside the region 10 (equivalent to that contained in 10 pieces of the Gd fuel rods).

Even in this embodiment having the square water rod, it is possible to obtain an effect similar to that in the first embodiment shown in FIG. 1.

(Embodiment 5)

Figure 8:
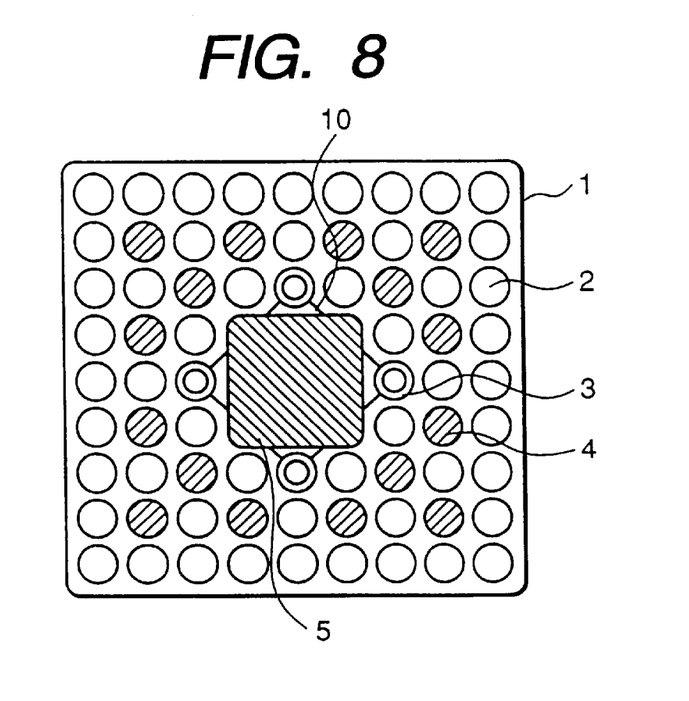
FIG. 8 is a transverse sectional view showing a fifth embodiment of the fuel assembly of the present invention.

A fifth embodiment of the present invention will be described below with reference to FIG. 8. This embodiment is configured that in the fourth embodiment, four pieces of the short-length fuel rods 3 at the outermost periphery are replaced with four pieces of the fuel rods 2 adjacent to the water rod 5. The other configuration is the same as that of the fourth embodiment. At the transverse cross-section of the upper region are present 68 pieces of the fuel rods. The Gd fuel rods 4 are all disposed outside the region 10 having a polygonal shape whose vertexes are located at the centers of the short-length fuel rods 3 arranged at the outermost layer, and are not adjacent to the short-sized rods 3.

In this embodiment, coolant is allowed to easily flow near the short-length fuel rods 3 adjacent to the water rods 5, so that there occurs a deviation in flow of the coolant. In this embodiment, however, since each of the short-length fuel rods 3 adjacent to the water rod 5 is not adjacent to another short-sized fuel rod 3, it is possible to suppress the deviation in flow of the coolant at a small value.

Further, in this embodiment, the short-length fuel rods 3 and the water rod 5, which promote moderation of neutrons in the surroundings, are concentrated at the central portion, and the Gd fuel rods 4 which absorb low energy neutrons in the surroundings are arranged on the outer peripheral side. Thus, the distribution of the low energy neutrons is flattened, and also the distribution of the thermal power is flattened. As a result, although the critical power is equal to or less than that in the fuel assembly shown in FIG. 7, the maximum linear power heat generation ratio is made smaller than that in the fuel assembly shown in FIG. 7. This leads to reduction in discharged amount of gas as a fissionable product in the fuel rods.

(Embodiment 6)

A sixth embodiment of the present invention will be described below with reference to FIG. 9. In this embodiment, the fuel rods are arranged in a square grid pattern of ten-columns/ten-rows. Two pieces of the large-sized water rods 5, each being formed into a circular shape in transverse cross-section, are disposed at a region containing eight grid points at a central portion of the fuel assembly. Two pieces of the short-length fuel rods 3 are disposed at central positions each being adjacent to both the water rods 5, and eight pieces of the short-length fuel rods 3 are provided in such a manner that two pieces are disposed at a central portion of each of the four outermost peripheral sides. One short-sized fuel rod 3 adjacent to the water rods 5 is not adjacent to the other short-sized fuel rod 3. Even in this embodiment, the short-length fuel rods 3 are not arranged in four 3×3 corner regions 6 to 9. At the transverse cross-section of the upper region are present 82 pieces of the fuel rods.

The Gd fuel rods of 20 pieces are arranged at positions excluding the outermost periphery of the fuel assembly, of which 8 pieces are arranged in the 3×3 corner regions 6 to 9. The enrichment of burnable poison contained in a Gd fuel rod 4a disposed at the second layer from each corner is higher than each of the other Gd fuel rods 4.

Figure 9:
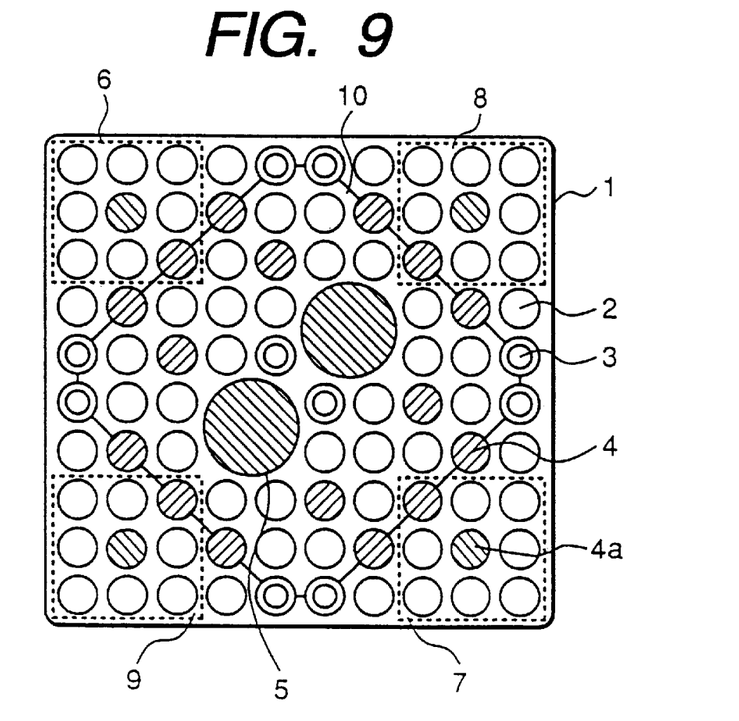
FIG. 9 is a transverse sectional view showing a sixth embodiment of the fuel assembly of the present invention.

A polygonal region whose vertexes are located at the centers of the short-length fuel rods 3 arranged at the outermost layer is an octagonal region 10 shown in FIG. 9. The number of the Gd fuel rods contained in the region 10 is 10 pieces, which is one-half the total number (20 pieces). However, since the amount of burnable poison contained in the Gd fuel rod 4a is smaller than the amount of burnable poison contained in each of the other Gd fuel rods 4, the total amount of burnable poison inside the region 10 is smaller than the total amount of burnable poison outside the region 10. As the enrichment of burnable poison is higher, the effect of absorbing neutrons becomes stronger and an absorbing ability can be kept for a long burning period.

Like this embodiment, by making smaller the amount of burnable poison inside the region 10 than the amount of burnable poison outside the region 10 through adjustment of the enrichment of burnable poison, there can be obtained an effect of improving a thermal margin. Further, since in this embodiment, the number of the fuel rods is larger than that in the first embodiment, the thermal margin can be further increased.

(Embodiment 7)

Figure 11:
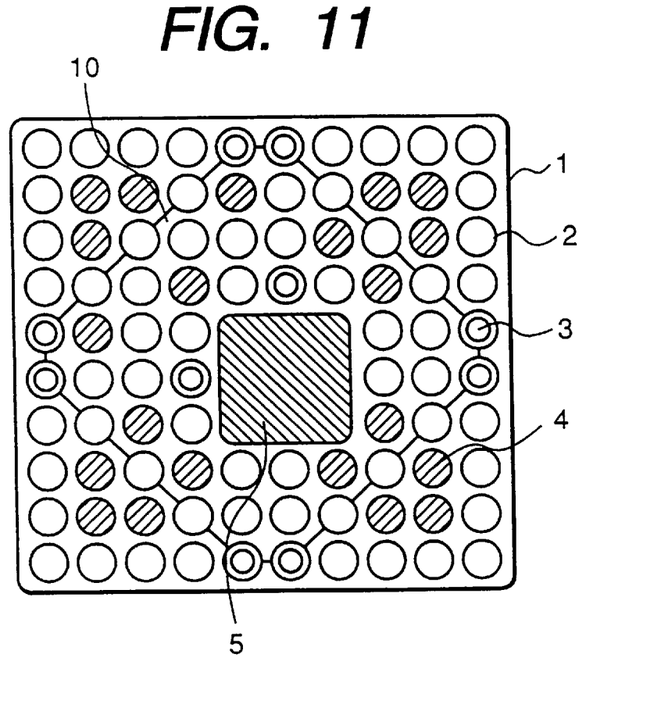
FIG. 11 is a transverse sectional view showing a seventh embodiment of the fuel assembly of the present invention.

A seventh embodiment of the present invention will be described with reference to FIG. 11. In this embodiment, the fuel rods are arranged in a square grid pattern of 10-columns/ten-rows, and one large-sized water rod 5, formed into a square shape in transverse cross-section, is disposed in a region containing nine grid points at a central portion of the fuel assembly. Two pieces of the short-length fuel rods 3 are arranged in the central portion at positions adjacent to the water rod 5, and eight pieces of the short-length fuel rods 3 are provided in such a manner that two pieces are disposed at each of the four outermost peripheral sides. One short-sized fuel rod 3 adjacent to the water rod 5 is not adjacent to the other short-sized fuel rod 3. Even in this embodiment, the short-length fuel rods 3 are not arranged in the four 3×3 corner regions. At the transverse cross-section of the upper region are present 81 pieces of the fuel rods.

The Gd fuel rods 4 of 21 pieces are arranged at positions excluding the outermost periphery of the fuel assembly. The number of the Gd fuel rods adjacent to the short-length fuel rods 3 is two pieces, which is less than one-half the total number. A polygonal region whose vertexes are located at the centers of the short-length fuel rods 3 arranged at the outermost layer is the same as the region 10 shown in FIG. 9. The amount of burnable poison contained in the region 10 is equivalent to that contained in nine pieces of the Gd fuel rods, which is smaller than the amount of burnable poison outside the region 10 (equivalent to that contained in 12 pieces of the Gd fuel rods).

In the case where there is a deviation in the distribution of the water rod 5 and the short-length fuel rods 3 like this embodiment, there easily occur deviations in the power distribution and the distribution of the flow rate of coolant; however, the thermal margin can be improved by adopting the arrangement of the Gd fuel rods 4 as shown in this embodiment.

(Embodiment 8)

Figure 12:
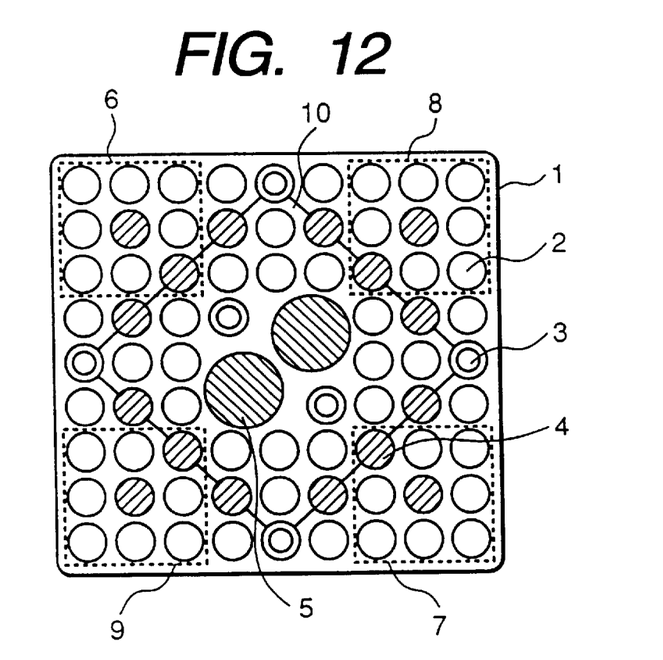
FIG. 12 is a transverse sectional view showing an eighth embodiment of the fuel assembly of the present invention.

An eighth embodiment of the present invention will be described below with reference to FIG. 12. In this embodiment, the arrangement of the Gd fuel rods in the first embodiment (FIG. 1) is combined with the arrangement of the short-sized fuel rods in the third embodiment (FIG. 6). In this embodiment, the fuel rods are arranged in a square grid pattern of nine-columns/nine-rows, and two water rods 5 are arranged in a region containing seven grid points at a central portion of the fuel assembly. Four pieces of the short-length fuel rods 3 are provided in such a manner that one piece is disposed at each of the four outermost peripheral sides, and two pieces of the remaining short-length fuel rods 3 are arranged at positions adjacent to the water rod 5.

One short-sized fuel rod 3 adjacent to the water rods 5 is not adjacent to the other short-sized fuel rod 3. At the transverse cross-section of the upper region are present 68 pieces of the fuel rods. The short-length fuel rods 3 are not arranged in the four 3×3 corner regions 6 to 9. The upper end of the short-sized fuel rod 3 is at a level being about one-half the fuel effective length of the fuel rod 2.

The Gd fuel rods 4 of 16 pieces, each containing burnable poison in the upper region, are arranged at positions excluding the outermost periphery of the fuel assembly. A polygonal region whose vertexes are located at the centers of the short.-length fuel rods 3 arranged at the outermost layer is the same as the region 10 shown in FIG. 1. At the transverse cross-section of the upper region, the amount of burnable poison contained in the region 10 is equivalent to that contained in six pieces of the Gd fuel rods, which is smaller than the amount of burnable poison outside the region 10 (equivalent to that contained in ten pieces of the Gd fuel rods).

In this embodiment, since the number of the short-sized fuel rods at the central portion is smaller than that in the first embodiment, the flow rate of coolant at the corner regions, and thereby the critical power is made higher. On the other hand, since the number of the Gd fuel rods is larger than that in the third embodiment, the reactivity of the fuel assembly is made lower, and thereby the thermal power of the fuel assembly in the core can be made smaller.

(Embodiment 9)

Figure 13:
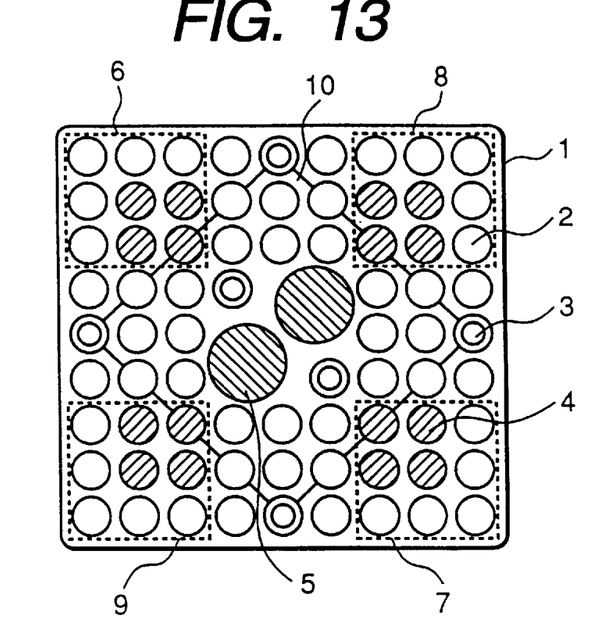
FIG. 13 is a transverse sectional view showing a ninth embodiment of the fuel assembly of the present invention.

A ninth embodiment of the present invention will be described below with reference to FIG. 13. In this embodiment, only the arrangement of the Gd fuel rods 4 in the eighth embodiment is changed. The Gd fuel rods in this embodiment are arranged at each corner of the second layer from the outermost periphery of the fuel assembly, positions adjacent thereto, and at each corner from the outermost periphery.

At the transverse cross-section of the upper region, the amount of burnable poison contained in the region 10 is equivalent to that contained in two pieces of the Gd fuel rods, which is smaller than the amount of burnable poison outside the region (equivalent to that contained in 14 pieces of the Gd fuel rods).

In this embodiment, since burnable poison is concentratedly arranged in the corner regions, it is possible to increase the effect of lowering the power of the fuel rods at the peripheral portion. As a result, the power of the fuel rods in the corner regions is reduced about 2% as compared with that in the eighth embodiment shown in FIG. 12, and thereby the critical power is made higher about 2% or more.

(Embodiment 10)

A tenth embodiment of the present invention will be described below with reference to FIG. 14. in this embodiment, the number and the arrangement of the Gd fuel rods 4 in the eighth embodiment are changed. The fuel assembly in this embodiment is that to be loaded in a core (D-lattice core) in which a width of a water gap between fuel assemblies is different between a side in which a cross-type control rod is inserted (hereinafter, referred to as a "control rod side") and the opposed side (hereinafter, referred to as an "anti-control rod side").

Figure 14:
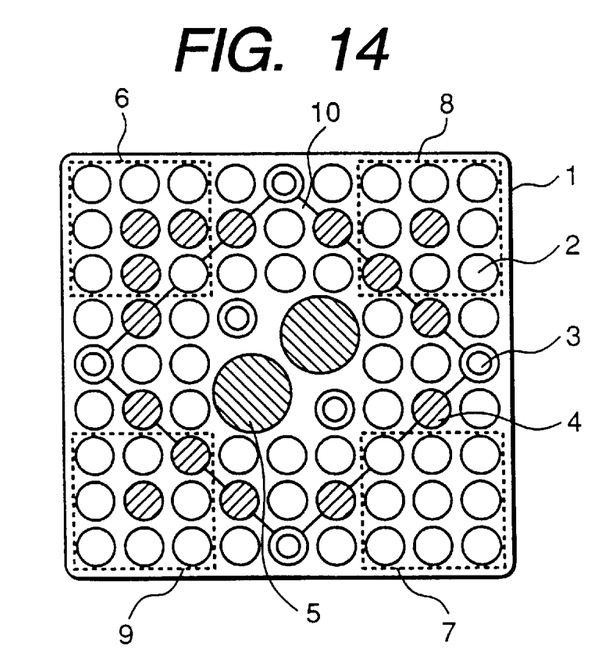
FIG. 14 is a transverse sectional view showing a tenth embodiment of the fuel assembly of the present invention.

In FIG. 14, the left upper side is the control rod side, and the right lower side is the anti-control rod side. The width of the water gap is wider on the control rod side and narrower on the anti-control rod side. Since the effect of moderating neutrons becomes higher on the side where the width of the water gap is wide, the power of the fuel rods facing to the wide water gap becomes relatively higher. Accordingly, in this embodiment, the distribution of the Gd fuel rods is made asymmetric, to relax a deviation in power distribution.

To be more specific, while the Gd fuel rods 4 of three pieces are arranged in the 3×3 corner region 6 on the control rod side, no Gd fuel rod 4 is arranged in the 3×3 corner region 7 on the anti-control rod side. The Gd fuel rods 4 of 15 pieces are arranged at positions excluding the outermost periphery of the fuel assembly. At the transverse cross-section of the upper region, the a mount of burnable poison contained in the region 10 is equivalent to that contained in five pieces of the Gd fuel rods, which is smaller than the amount of burnable poison outside the region 10 (equivalent to that contained in ten pieces of the Gd fuel rods).

In this embodiment, the short-length fuel rods 3 are not present in the 3×3 corner region 6 in which the power of the fuel rods are liable to be maximized and the Gd fuel rods 4 are concentratedly arranged in the region o, so that the power distribution in the fuel assembly can be flattened. As a result, it is possible to enhance the critical power in the fuel assembly loaded in the D-lattice core.

Although in the above embodiments, description is made using uranium as a fissionable material, the present invention can be applied to the case using a mixed oxide (MOX) of uranium and plutonium. That is, the effect of improving the thermal margin can be obtained for the case using the MOX fuel, like the case of using the uranium fuel, insofar as the present invention is applied to the distribution of both burnable poison and a fissionable material.

What is claimed is:

1. A fuel assembly comprising:

a plurality of fuel rods including a plurality of first fuel rods shorter in length than others of said fuel rods and a plurality of second fuel rods containing burnable poison, said plurality of fuel rods being arranged in a square grid pattern of 9-columns/9-rows or more; and least one neutron moderator rod;

wherein said first fuel rods are arranged at positions other than in 3-columns/3-rows regions at four corner portions, and said first fuel rods are arranged at each side of the outermost periphery;

said second fuel rods are arranged at positions excluding the outermost periphery;

the number of those, of said second fuel rods, adjacent to said first fuel rods in the four directions of front and rear and right and left is one-half or less the total number of said second fuel rods; and at a transverse cross-section of the region upward from upper ends of said first fuel rods, the amount of burnable poison contained in a polygonal region, whose vertexes are located at centers of those of said first fuel rods arranged at the outermost layer, is smaller than the amount of burnable poison outside said polygonal region.

2. A fuel assembly comprising:

a plurality of fuel rods including a plurality of first fuel rods shorter in length than others of said fuel rods and a plurality of second fuel rods containing burnable poison, said plurality of fuel rods being arranged in a square grid pattern of 9-columns/9-rows or more; and a neutron moderator rod;

wherein said first fuel rods are arranged at positions other than in 3-columns/3-rows regions at four corner portions, and said first fuel rods are arranged at each side of the outermost periphery;

said second fuel rods are arranged at positions excluding the outermost periphery; and most of fuel rods being adjacent to said first fuel rods in the four directions of front and rear and right and left and containing no burnable poison have the highest average enrichment of a fissile in the region upward from upper ends of said first fuel rods.

3. A fuel assembly according to claim 1, wherein fuel rods being adjacent to said short-length fuel rods in said four directions of front and rear and right and left and being arranged at the outermost periphery are adjacent to one of said burnable poison rods in said four directions of front and rear and right and left.

4. A fuel assembly according to claim 1, wherein 74 pieces of said fuel rods including 6 pieces of said short-length fuel rods and 12 pieces or more of said burnable poison rods are arranged in a square grid pattern of 9-columns/9-rows, and two pieces of large-sized water rods are arranged in a region containing 7 grid points at a central portion of said fuel assembly.

5. A fuel assembly according to claim 1, wherein four pieces of said short-length fuel rods are arranged at each center of four outermost peripheral sides, and two pieces of said short-length fuel rods are arranged at positions adjacent to said water rods.

6. A fuel assembly according to claim 2, wherein fuel rods being adjacent to said short-length fuel rods in said four directions of front and rear and right and left and being arranged at the outermost periphery are adjacent to one of said burnable poison rods in said four directions of front and rear and right and left.

7. A fuel assembly according to claim 2, wherein 74 pieces of said fuel rods including 6 pieces of said short-length fuel rods and 12 pieces or more of said burnable poison rods are arranged in a square grid pattern of 9-columns/9-rows, and two pieces of large-sized water rods are arranged in a region containing 7 grid points at a central portion of said fuel assembly.

8. A fuel assembly according to claim 2, wherein four pieces of said short-length fuel rods are arranged at each center of four outermost peripheral sides, and two pieces of said short-length fuel rods are arranged at positions adjacent to said water rods.

* * * * *